Patented May 11, 1937

2,079,927

UNITED STATES PATENT OFFICE 2,079,927

THIAZOLE COMPOUNDS

Gerhard Schrader, Opladen, near Cologne-on-the-Rhine, Germany, assignor to General Aniline Works, Inc., New York, N. Y., a corporation of Delaware No Drawing. Application December 6, 1932, Serial No. 646,031. In Germany December 11, 1931

3 Claims. (Cl. 260—44)

The present invention relates to new thiazole compounds, more particularly it relates to thiazole compounds which may be represented by the probable general formula:

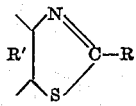

wherein R stands for a radical of the alkyl or aryl series and R' stands for a benzene nucleus or for a naphthalene nucleus being attached to the thiazole nucleus in an α.β-position, said benzene or naphthalene nucleus bearing as substituents a hydroxy group and in o-position thereto a carboxylic acid arylamide group.

My new compounds are prepared according to the usual methods of preparing carboxylic acid arylamides by starting with the corresponding carboxylic acids and causing a primary aromatic amine of the benzene or naphthalene series, for instance, aniline, a toluidine, an anisidine, α- or β-napthylamine, to act upon it in an organic solvent, such as nitrobenzene, and at elevated temperature, for instance, by refluxing, and in the presence of a suitable condensing agent, such as phosphorus oxychloride.

The starting hydroxythiazoles used for carrying out my invention are obtainable by treating thioacyl derivatives of alkoxy-phenyl- or -naphthylamines with oxidizing agents and removing the alkyl group from the alkoxy group in the usual manner, the whole process being more fully described in the following examples. The corresponding o-hydroxycarboxylic acids are obtainable by treating the hydroxy thiazoles according to the synthesis of Kolbe in the presence of alkali with carbon-dioxide under superatmospheric pressure at elevated temperatures.

The acylthioarylamines used in this process are obtainable from the corresponding acylarylamines according to the process of German Patent 385,376 by causing phosphorus pentasulfide to act upon the amides in xylene solution with the addition of an alkali metal- or ammonium-sulfide.

My new compounds are generally yellowish water-insoluble substances, soluble in organic solvents and are valuable intermediate products in the manufacture of dyestuffs.

The invention is illustrated by the following examples, without being limited thereto:

*Example 1.*—27.2 parts by weight of 2-phenyl-6-hydroxybenzthiazole-carboxylic acid are heated in 600 parts by weight of toluene at a temperature of 60° C., and 9.3 parts by weight of aniline are added thereto. At a temperature of 65–70° C., 2 parts by weight of phosphorus trichloride are dropped in, and the solution is heated for about 6 hours, until developing of hydrochloric acid has ceased. The crude product is purified by dissolving in soda lye and precipitating with the aid of soda. In this manner the new arylamide having the following formula:

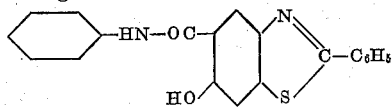

is obtained in form of a grey crystalline substance.

The starting o-hydroxycarboxylic acid is obtainable as follows: 25 parts by weight of 2-phenyl-6-hydroxybenzothiazole (compare Fries, Annalen der Chemie, vol. 454, page 239) are transformed into the potassium salt by means of 6.1 parts by weight of potassium hydroxide. The well dried and pulverized potassium salt is heated for 10 hours in an autoclave with 100 parts by weight of potassium carbonate under a carbon-dioxide pressure of 65 atmospheres at a temperature of 220° C. The crude product is then dissolved in hot water, and the hydroxycarboxylic acid is precipitated by acidification.

*Example 2.*—25.9 parts by weight of naphtho-7'-hydroxy-6'-carboxyl-(1'.2'.5.4)-2-methylthiazole are heated in 900 parts by weight of toluene at a temperature of 60° C., and 11 parts by weight of o-toluidine are added thereto. At a temperature of 65–70° C., 6 parts by weight of phosphorus trichloride are dropped in, and then the solution is heated to boiling for about 8 hours, until developing of hydrochloric acid has ceased. After this, excess soda solution is added to the reaction mass, and the toluene is blown off by means of steam. On cooling, the arylamide of the following formula:

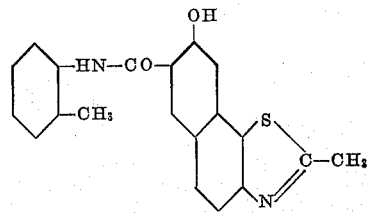

crystallizes from the sodaalkaline solution in form of intense yellow colored needles.

The starting o-hydroxycarboxylic acid is obtainable as follows: 50 parts by weight of 7-methoxy-2-thio-acetic acid naphthalide (melting point 137°) of the following constitution:

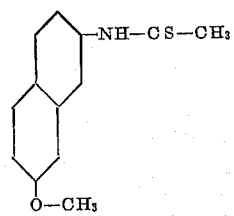

are dissolved in 600 parts by weight of alcohol and added to 100 parts by weight of an aqueous n-sodium hydroxide solution. The thioamide enters into solution, and the cold alkaline solution is slowly added with stirring to a solution of 160 parts by weight of potassium ferrocyanide dissolved in 600 parts by weight of water, while stirring is continued for an hour. The methoxynaphthothiazole separating in yellowish flakes is filtered off, washed with water and recrystallized from alcohol with the addition of animal charcoal. From alcohol it crystallizes in colorless, strongly refracting prisms of the melting point 119° C.

5 parts by weight of the 2-methyl-7'-methoxynaphtho-2'.1'.4.5-thiazole thus obtained are heated for 1 hour with 15 parts by weight of aluminium chloride dissolved in 600 parts by weight of toluene at a temperature of 90° C. while stirring. After the addition of soda lye, the toluene is blown off by means of steam. On acidifying with dilute hydrochloric acid, the hydroxynaphthothiazole is precipitated which may be purified by redissolving from soda lye. The new thiazole crystallizes from acetic acid solution in long, colorless needles of the melting point 258° C. It corresponds to the following formula:

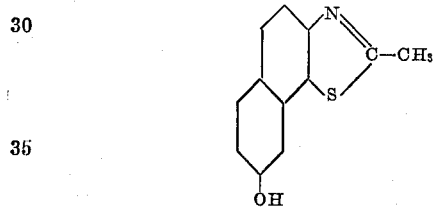

20 parts by weight of 2-methyl-7'-hydroxynaphtho-(2'.1'.4.5)-thiazole are transformed into the potassium salt by means of 5.4 parts by weight of potassium hydroxide. The well dried and pulverized potassium salt is mixed with 100 parts by weight of potassium carbonate and heated for 8 hours in an autoclave under a carbon-dioxide pressure of 60 atmospheres and at a temperature of 220° C. The working up is by dissolving the reaction mixture in water and precipitating the free acid by acidifying.

Example 3.—22.9 parts by weight of naphtho-6'-hydroxy-7'-carboxyl-(1'.2'.5.4)-2-methylthiazole are condensed, as described in Example 2, with 10 parts by weight of o-toluidine dissolved in 1200 parts by weight of toluene in the presence of 6 parts by weight of phosphorus trichloride. After about 8 hours the condensation is complete; the solution is rendered sodaalkaline, and the toluene is blown off with steam. The separated arylamide is purified by dissolving in soda lye and reprecipitating by means of carbonic acid. The new arylamide coresponding to the following formula:

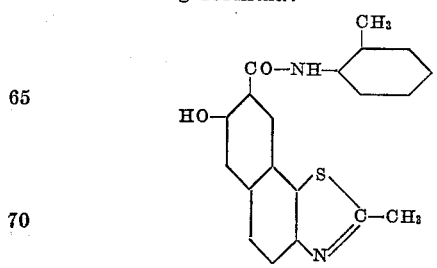

is a pale yellow substance, being soluble in soda lye with an intense yellow coloration and has the melting point above 300° C.

The starting o-hydroxycarboxylic acid is obtainable as follows: 50 parts by weight of 6-methoxythioacetic acid naphthalide (melting point 170° C.) of the following constitution:

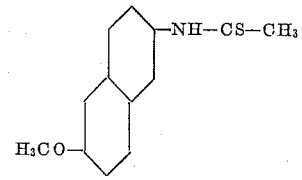

are dissolved in 1000 parts by weight of alcohol and added to 1000 parts by weight of an aqueous n-soda solution. The alkaline solution of the thioamide is slowly added with stirring to a solution of 160 parts by weight of potassium ferrocyanide dissolved in 700 parts by weight of water. After one hour the yellowish thiazole is filtered, washed with water and crystallized from alcohol.

300 parts by weight of the 2-methyl-6-methoxynaphtho-2'.1'.4.5-thiazole thus obtained are heated for 18 hours with 1000 parts by weight of a solution of hydrobromic acid in glacial acetic acid at a temperature of 120° C. After redissolving from aqueous soda lye and recrystallizing from alcohol, the hydroxythiazole is obtained in form of colorless microscopic needles of the melting point 237° C. The new hydroxynaphthothiazole corresponds to the folowing formula:

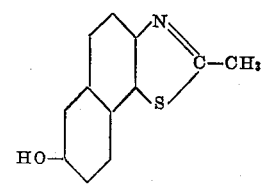

31 parts by weight of 2-methyl-6'-hydroxynaphtho-(2'.1'.4.5)-thiazole are transformed into the potassium salt by means of 9 parts by weight of potassium hydroxide. The dried potassium salt is mixed with 150 parts by weight of potassium carbonate and heated for 8 hours in an autoclave under a carbondioxide pressure of 60 atmospheres at 220° C. The working up is by dissolving the reaction mixture in water and precipitating the free acid by acidifying.

I claim:
1. The thiazole compound of the following formula:

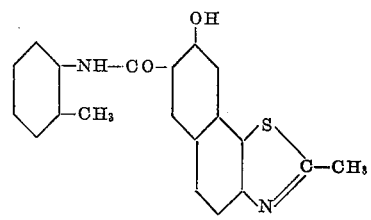

crystallizing from sodaalkaline solution in form of intense yellow colored needles, and being a valuable intermediate product in the manufacture of dyestuffs.

2. The thiazole compound of the following formula:

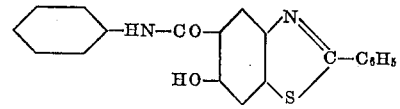

being a grey crystalline substance and being a valuable intermediate product in the manufacture of dyestuffs.

3. Thiazole compounds of the following formula:

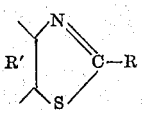

wherein R stands for a radical of the alkyl or benzene series and

is a member of the group consisting of a phenylene nucleus bearing as substituents a hydroxy group and a carboxylic acid aryl amide group ortho thereto and a 1.2-naphthylene nucleus bearing as substituents in 6 and 7 positions a hydroxy group and a carboxylic acid aryl amide group, the aryl group in each case being an aryl group of the benzene and naphthalene series, being generally yellowish water-insoluble substances, soluble in organic solvents and being valuable intermediate products in the manufacture of dyestuffs.

GERHARD SCHRADER.